US012747710B2

(12) United States Patent
Claywell et al.

(10) Patent No.: US 12,747,710 B2
(45) Date of Patent: Sep. 29, 2026

(54) SYSTEMS AND METHODS FOR MIGITATING COLD START EMISSIONS BY MANAGING TURBOCHARGER TURBINE SPEED

(71) Applicant: GM GLOBAL TECHNOLOGY OPERATIONS LLC, Detroit, MI (US)

(72) Inventors: Mark Claywell, Birmingham, MI (US); Azeem Sarwar, Rochester Hills, MI (US); Maqsood Rizwan Ali Khan, Troy, MI (US); Lei Wang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 63 days.

(21) Appl. No.: 18/904,911

(22) Filed: Oct. 2, 2024

(65) Prior Publication Data

US 2026/0117718 A1 Apr. 30, 2026

(51) Int. Cl.

*F02D 41/06* (2006.01)
*F02D 41/00* (2006.01)
*F02D 41/02* (2006.01)

(52) U.S. Cl.

CPC ....... *F02D 41/064* (2013.01); *F02D 41/0007* (2013.01); *F02D 41/0255* (2013.01); *F02D 41/0295* (2013.01); *F02D 2200/0804* (2013.01); *F02D 2200/0814* (2013.01)

(58) Field of Classification Search

CPC ............. F02D 41/0295; F02D 41/0255; F02D 41/0007; F02D 41/064

See application file for complete search history.

(56) References Cited

U.S. PATENT DOCUMENTS 10,822,994 B2 * 11/2020 Richards ............... F01D 21/006
2011/0107739 A1 5/2011 Shimizu et al.
2020/0224614 A1 * 7/2020 Hu .......................... F02B 37/10

* cited by examiner

*Primary Examiner* — Kevin A Lathers

(74) *Attorney, Agent, or Firm* — Ingrassia Fisher & Lorenz, LLP | IFL

(57) ABSTRACT

A control signal is issued to a turbo shaft actuator to rotate a turbine at a first turbine speed in response to an ignition turn on signal. The first turbine speed is different from a default turbine speed. The rotation of the turbine at the default turbine speed results in exhaust gas having a first exhaust gas temperature after the exhaust gas passes through the turbine to a catalyst brick of the vehicle. The rotation of the turbine at the first turbine speed results in the exhaust gas having a second exhaust gas temperature after the exhaust gas passes through the turbine to the catalyst brick. The second exhaust gas temperature is higher than the first exhaust gas temperature. When the catalyst temperature is greater than a catalyst light-off temperature a control signal is issued to the turbo shaft actuator to rotate the turbine at the default speed.

20 Claims, 6 Drawing Sheets

SYSTEMS AND METHODS FOR MIGITATING COLD START EMISSIONS BY MANAGING TURBOCHARGER TURBINE SPEED

INTRODUCTION

The technical field generally relates to vehicles, and more particularly relates to systems and methods for mitigating cold start emissions by managing turbocharger turbine speed.

Vehicles that include internal combustion engines generate exhaust gases as a by-product of a combustion process. Such vehicles often rely on a catalyst brick in a catalytic converter to process the exhaust gases prior to release of the processed exhaust gases as emissions from the vehicle. Catalyst bricks typically need to reach an operating temperature, such as for example 500 C.°, to effectively process the exhaust gases. The operating temperature of the catalyst brick is referred to as a catalyst light-off temperature. A cold-start of an engine occurs when a vehicle is started after the engine has been turned off for several hours. At cold start-up, the vehicle may emit excessive emissions until the catalyst brick reaches the catalyst light-off temperature.

Accordingly, it is desirable to provide systems and methods for mitigating cold start emissions by managing turbocharger turbine speed. Other desirable features and characteristics will become apparent from the subsequent detailed description and the appended claims, taken in conjunction with the accompanying drawings and the foregoing technical field and background.

SUMMARY

A method of mitigating cold start emissions generated by a vehicle includes: receiving, at a controller, an ignition turn on signal from an ignition switch of the vehicle; issuing, by the controller, a first control signal to a turbo shaft actuator to rotate a turbine of a turbocharger of the vehicle at a first turbine speed in response to the ignition turn on signal, wherein the first turbine speed is different from a default turbine speed associated with the ignition turn on signal, wherein: rotation of the turbine at the default turbine speed results in exhaust gas having a first exhaust gas temperature after the exhaust gas passes through the turbine to a catalyst brick of the vehicle, rotation of the turbine at the first turbine speed results in the exhaust gas having a second exhaust gas temperature after the exhaust gas passes through the turbine to the catalyst brick, and the second exhaust gas temperature is higher than the first exhaust gas temperature; receiving, at the controller, oxygen sensor data associated with the catalyst brick from an oxygen sensor; determining a catalyst temperature based on the oxygen sensor data; determining, by the controller, whether the catalyst temperature is greater than a catalyst light-off temperature; and issuing, by the controller, a second control signal to the turbo shaft actuator to rotate the turbine at the default speed based on the determination.

In at least one embodiment, the method further includes issuing the first control signal, by the controller, to the turbo shaft actuator to rotate the turbine at the first turbine speed, wherein the first turbine speed is zero and the turbo shaft actuator inhibits rotation of the turbine in response to the first control signal.

In at least one embodiment, the method further includes receiving, at the controller, the first turbine speed from a turbine model, wherein the turbine model is configured to: determine a first turbine outlet swirl of the exhaust gas resulting from the exhaust gas flowing through the turbine while maintaining the turbine at a turbine speed of zero, and generate the first turbine speed based on the first turbine outlet swirl, wherein a second turbine outlet swirl of the exhaust gas resulting from the exhaust gas flowing through the turbine while rotating the turbine at the first turbine speed is less than the first turbine outlet swirl.

In at least one embodiment, the method further includes issuing the first control signal, by the controller, to the turbo shaft actuator to rotate the turbine at the first turbine speed, wherein the first turbine speed reduces at least a portion of the first turbine outlet swirl to generate the second turbine outlet swirl.

In at least one embodiment, the method further includes receiving, at the controller, the first turbine speed from a turbine model, wherein the turbine model is configured to: determine a first exhaust gas expansion resulting from the exhaust gas flowing through the turbine while rotating the turbine at the default turbine speed, and generate the first turbine speed to be less than the default turbine speed, wherein a second exhaust gas expansion resulting from the exhaust gas flowing through the turbine while rotating the turbine at the first turbine speed is less than the first exhaust gas expansion.

In at least one embodiment, the first exhaust gas expansion and the second gas expansion is based in part on an exhaust flow rate from an exhaust manifold of an engine to the turbine.

In at least one embodiment, the method further includes receiving, at the controller, the first turbine speed from a turbine model, wherein the turbine model is configured to: determine a first turbine outlet swirl of the exhaust gas resulting from the exhaust gas flowing through the turbine while maintaining the turbine at a turbine speed of zero, determine a first exhaust gas expansion resulting from the exhaust gas flowing through the turbine while rotating the turbine at the default turbine speed, and generate the first turbine speed based in on the first turbine outlet swirl and to be less than the default turbine speed, wherein: a second turbine outlet swirl of the exhaust gas resulting from the exhaust gas flowing through the turbine while rotating the turbine at the first turbine speed is less than the first turbine outlet swirl, and a second exhaust gas expansion resulting from the exhaust gas flowing through the turbine while rotating the turbine at the first turbine speed is less than the first exhaust gas expansion.

In at least one embodiment, the method further includes receiving, at the controller, the first turbine speed from a turbine model, wherein the turbine model is configured to generate the first turbine speed based on at least one of an exhaust gas flow rate, an exhaust gas temperature, a turbine fan blade configuration, and an altitude of the vehicle.

In at least one embodiment, the method further includes issuing a third control signal, by the controller, to a wastegate actuator to open a wastegate to enable a portion of the exhaust gas to bypass the turbine and flow from an exhaust manifold of the vehicle to the catalyst brick via the wastegate.

In at least one embodiment, the method further includes issuing, by the controller, the first control signal and the second control signal to the turbo shaft actuator via a motor generator unit (MGU).

A system for mitigating cold start emissions generated by a vehicle includes at least one processor and at least one memory communicatively coupled to the at least one processor. The at least one memory includes instructions that upon execution by the at least one processor, causes the at least one processor to: receive an ignition turn on signal from an ignition switch of the vehicle; issue a first control signal to a turbo shaft actuator to rotate a turbine of a turbocharger of the vehicle at a first turbine speed in response to the ignition turn on signal, wherein the first turbine speed is different from a default turbine speed associated with the ignition turn on signal, wherein: rotation of the turbine at the default turbine speed results in exhaust gas having a first exhaust gas temperature after the exhaust gas passes through the turbine to a catalyst brick of the vehicle, rotation of the turbine at the first turbine speed results in the exhaust gas having a second exhaust gas temperature after the exhaust gas passes through the turbine to the catalyst brick, and the second exhaust gas temperature is higher than the first exhaust gas temperature; receive oxygen sensor data associated with the catalyst brick from an oxygen sensor; determine a catalyst temperature based on the oxygen sensor data; determine whether the catalyst temperature is greater than a catalyst light-off temperature; and issue a second control signal to the turbo shaft actuator to rotate the turbine at the default speed based on the determination.

In at least one embodiment, the at least one memory further includes instructions that upon execution by the at least one processor, causes the at least one processor to issue the first control signal to the turbo shaft actuator to rotate the turbine at the first turbine speed, wherein the first turbine speed is zero and the turbo shaft actuator inhibits rotation of the turbine in response to the first control signal.

In at least one embodiment, the at least one memory further includes instructions that upon execution by the at least one processor, causes the at least one processor to receive the first turbine speed from a turbine model, wherein the turbine model is configured to: determine a first turbine outlet swirl of the exhaust gas resulting from the exhaust gas flowing through the turbine while maintaining the turbine at a turbine speed of zero, and generate the first turbine speed based on the first turbine outlet swirl, wherein a second turbine outlet swirl of the exhaust gas resulting from the exhaust gas flowing through the turbine while rotating the turbine at the first turbine speed is less than the first turbine outlet swirl.

In at least one embodiment, the at least one memory further includes instructions that upon execution by the at least one processor, causes the at least one processor to issue the first control signal to the turbo shaft actuator to rotate the turbine at the first turbine speed, wherein the first turbine speed reduces at least a portion of the first turbine outlet swirl to generate the second turbine outlet swirl.

In at least one embodiment, the at least one memory further includes instructions that upon execution by the at least one processor, causes the at least one processor to receive the first turbine speed from a turbine model, wherein the turbine model is configured to: determine a first exhaust gas expansion resulting from the exhaust gas flowing through the turbine while rotating the turbine at the default turbine speed, and generate the first turbine speed to be less than the default turbine speed, wherein a second exhaust gas expansion resulting from the exhaust gas flowing through the turbine while rotating the turbine at the first turbine speed is less than the first exhaust gas expansion.

In at least one embodiment, the first exhaust gas expansion and the second gas expansion is based in part on an exhaust flow rate from an exhaust manifold of an engine to the turbine.

In at least one embodiment, the at least one memory further include instructions that upon execution by the at least one processor, causes the at least one processor to receive the first turbine speed from a turbine model, wherein the turbine model is configured to: determine a first turbine outlet swirl of the exhaust gas resulting from the exhaust gas flowing through the turbine while maintaining the turbine at a turbine speed of zero, determine a first exhaust gas expansion resulting from the exhaust gas flowing through the turbine while rotating the turbine at the default turbine speed, and generate the first turbine speed based in on the first turbine outlet swirl and to be less than the default turbine speed, wherein: a second turbine outlet swirl of the exhaust gas resulting from the exhaust gas flowing through the turbine while rotating the turbine at the first turbine speed is less than the first turbine outlet swirl, and a second exhaust gas expansion resulting from the exhaust gas flowing through the turbine while rotating the turbine at the first turbine speed is less than the first exhaust gas expansion.

In at least one embodiment, the at least one memory further includes instructions that upon execution by the at least one processor, causes the at least one processor to issue a third control signal to a wastegate actuator to open a wastegate to enable a portion of the exhaust gas to bypass the turbine and flow from an exhaust manifold of the vehicle to the catalyst brick via the wastegate.

In at least one embodiment, the at least one memory further includes instructions that upon execution by the at least one processor, causes the at least one processor to issuing the first control signal and the second control signal to the turbo shaft actuator via a motor generator unit (MGU).

A vehicle including a system for mitigating cold start emissions generated by the vehicle includes at least one processor and at least one memory communicatively coupled to the at least one processor. The at least one memory includes instructions that upon execution by the at least one processor, causes the at least one processor to: receive an ignition turn on signal from an ignition switch of the vehicle; issue a first control signal to a turbo shaft actuator to rotate a turbine of a turbocharger of the vehicle at a first turbine speed in response to the ignition turn on signal, wherein the first turbine speed is different from a default turbine speed associated with the ignition turn on signal, wherein: rotation of the turbine at the default turbine speed results in exhaust gas having a first exhaust gas temperature after the exhaust gas passes through the turbine to a catalyst brick of the vehicle, rotation of the turbine at the first turbine speed results in the exhaust gas having a second exhaust gas temperature after the exhaust gas passes through the turbine to the catalyst brick, and the second exhaust gas temperature is higher than the first exhaust gas temperature; receive oxygen sensor data associated with the catalyst brick from an oxygen sensor; determine a catalyst temperature based on the oxygen sensor data; determine whether the catalyst temperature is greater than a catalyst light-off temperature; and issue a second control signal to the turbo shaft actuator to rotate the turbine at the default speed based on the determination.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
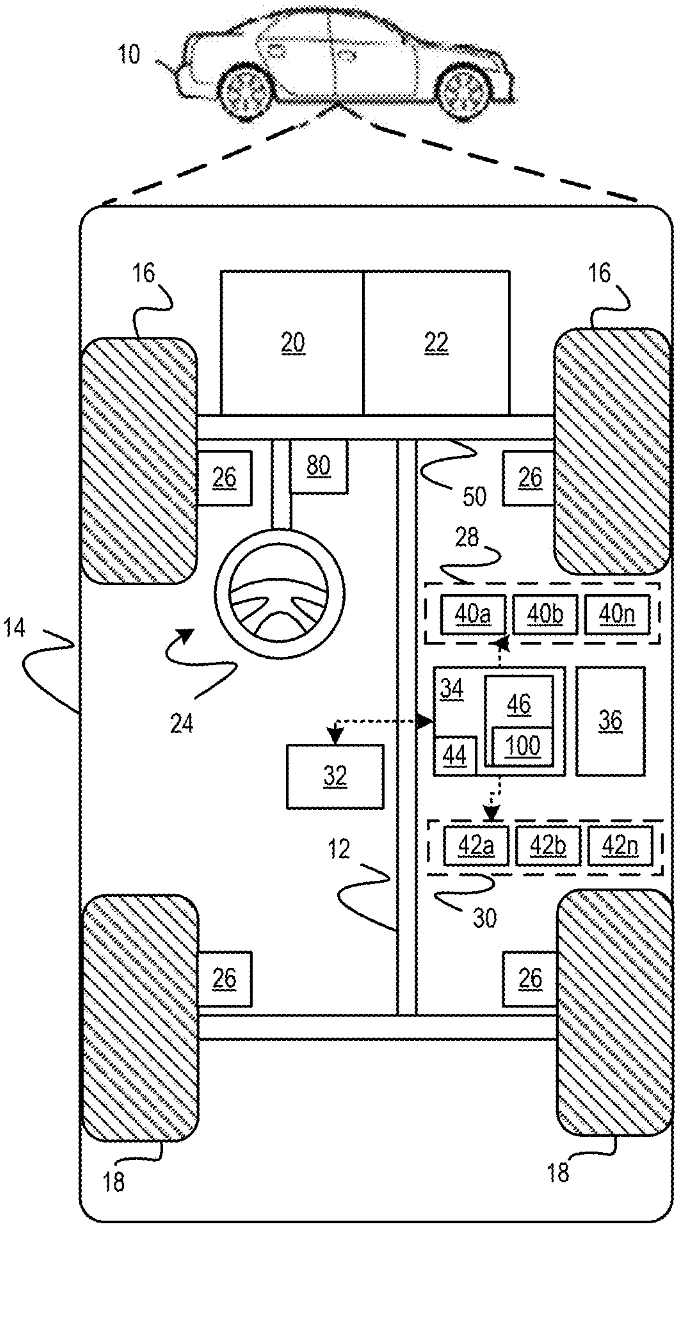
FIG. 1 is a functional block diagram of a vehicle including a cold start emission mitigation system in accordance with at least one embodiment.

Referring to FIG. 1, a functional block diagram of a vehicle including a cold start emission mitigation system 100 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 includes an internal combustion engine (ICE). The propulsion system 20 may, in various embodiments, also include an electric machine such as a traction motor, a fuel cell propulsion system, and/or any other type of propulsion configuration. The transmission system 22 is configured to transmit power from the propulsion system 20 to the vehicle wheels 16, 18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16, 18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40*a*-40*n* that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, a steering wheel sensor, and/or other sensors.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16, 18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate. In at least one embodiment, the vehicle dynamic sensors provide vehicle movement data.

The actuator system 30 includes one or more actuator devices 42a-42n that control one or more vehicle features such as, but not limited to, one or more vehicle wheels 16, 18 the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. In at least one embodiment, the computer-readable storage device 46 is at least one memory configured to store the cold start emission mitigation system 100.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
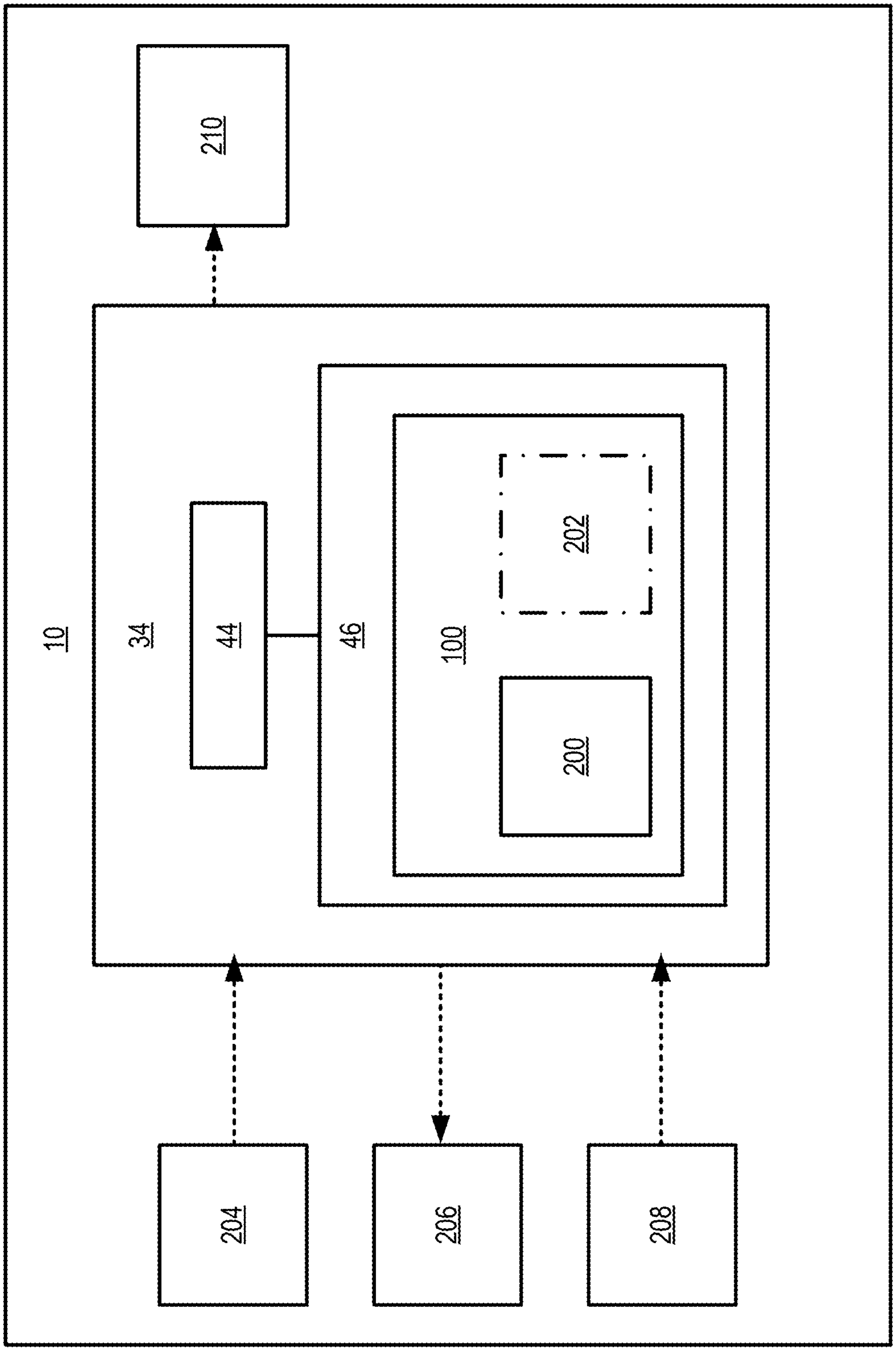
FIG. 2 is a functional block diagram of a controller including a cold start emission mitigation system in accordance with at least one embodiment.

Referring to FIG. 2, a functional block diagram of a controller 34 including a cold start emission mitigation system 100 in accordance with at least one embodiment is shown. The controller 34 includes at least one processor 44 and at least one memory 46. The at least one processor 44 is a programable device that includes one or more instructions stored in or associated with the at least one memory 46. The at least one memory 46 includes instructions that the at least one processor 44 is configured to execute. The at least one memory 46 includes an embodiment of the cold start emission mitigation system 100 that is configured to mitigate cold start emissions by managing turbocharger turbine speed. In at least one embodiment the cold start emission mitigation system 100 includes a turbine speed manager 200. In at least one embodiment, the cold start emission mitigation system 100 includes the turbine speed manager 200 and a turbine model 202. The controller 34 is configured to be communicatively coupled to an ignition switch 204, a turbo shaft actuator 206, one or more oxygen sensor(s) 208, and a wastegate actuator 210. The controller 34 may include additional components that facilitate operation of the cold start emission mitigation system 100. The operation of the cold start emission mitigation system 100 will be described in further detail below.

Figure 3:
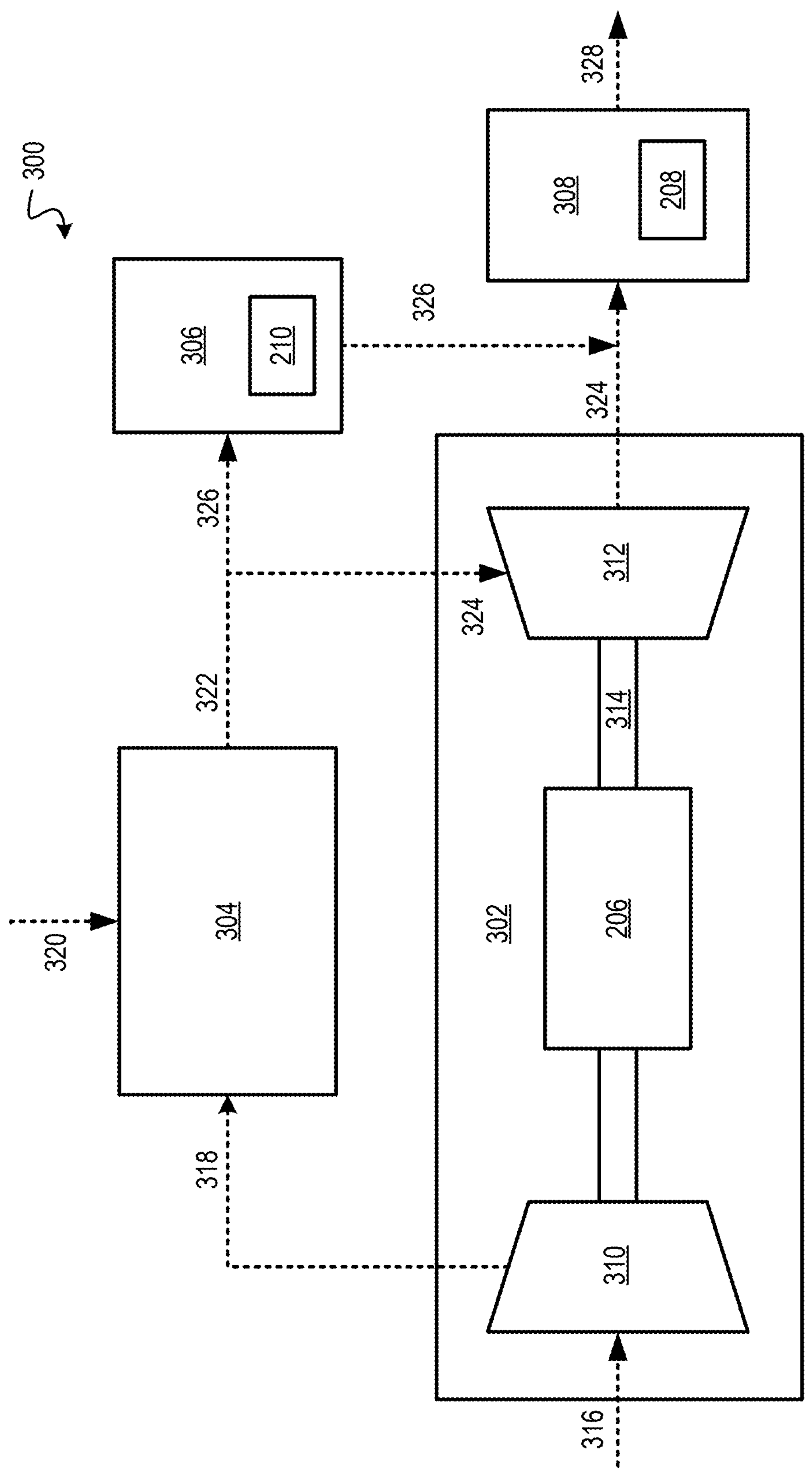
FIG. 3 is a functional block diagram of an internal combustion engine system in accordance with at least one embodiment.

Referring to FIG. 3, a functional block diagram of an internal combustion engine system 300 in accordance with at least one embodiment is shown. The internal combustion engine system 300 includes a turbocharger 302, an engine 304, a wastegate 306, and a catalyst brick 308. The turbocharger 302 includes a compressor 310, a turbine 312, a turbine shaft 314, and a turbine shaft actuator 206. The wastegate 306 includes a wastegate actuator 210. The catalyst brick 308 is associated with oxygen sensor(s) 208. The catalyst light off temperature is determined based on oxygen sensor data received from the oxygen sensor(s) 208. The conversion of the exhaust gas hydrocarbon and nitrous oxides is determined via the oxygen content.

The internal combustion engine system 300 may include additional components that facilitate operation of the internal combustion engine system 300.

The compressor 310 draws in ambient air 316 and generates compressed air 318. The engine 304 receives the compressed air 318. Fuel 320 is injected into the engine 304. The compressed air 318 and the fuel 320 combine to form an air-fuel mixture that is used in a combustion process by the engine 304. Exhaust gas 322 is generated by the engine 304 as a by-product of the combustion process. The cold start emission mitigation system 100 issues a command to the wastegate actuator 210 to place the wastegate 306 in a completely open position.

A first portion of the exhaust gas 324 generated by the engine 304 passes through the turbine 312 to the catalyst brick 308. A second portion of the exhaust gas 326 generated by the engine 304 bypasses the turbine 312 and passes through the wastegate 306 to the catalyst brick 308. The first portion of the exhaust gas 324 and the second portion of the exhaust gas 326 are processed by the catalyst brick 308 prior to release as emissions 328 into the external environment via, for example, a tailgate of the vehicle 10.

The vehicle 10 relies on the catalyst brick 308 to process the first and second portions of the exhaust gas 324, 326 prior to release of the processed exhaust gas as emissions 328 from the vehicle 10. Catalyst bricks 308 typically need to reach an operating temperature, such as for example 500 C°, to effectively process the exhaust gas 324, 326. The operating temperature of the catalyst brick 308 is referred to as a catalyst light-off temperature. In at least one embodiment, the catalyst light off temperature is value that is somewhere in the middle of a catalyst light off temperature range. A cold-start of an internal combustion engine system 300 occurs when a vehicle 10 is started after the engine 304 has been turned off for several hours. At cold start-up, the vehicle 10 may emit excessive emissions 328 until the catalyst brick 308 reaches the catalyst light-off temperature.

The cold start emission mitigation system 100 is configured to manage a rotational speed of the turbine 312 via the turbo shaft actuator 206 to accelerate the process of the catalyst brick 308 reaching the catalyst light-off temperature to mitigate cold start emissions 328. The cold start emission mitigation system 100 manages the rotation of the turbine 312 to reduce the heat transferred from the first portion of the exhaust gas 324 to the exhaust system walls prior to the exhaust gas 324 reaching the catalyst brick 308 thereby preserving as much heat as possible to heat the catalyst brick 308.

Figure 4:
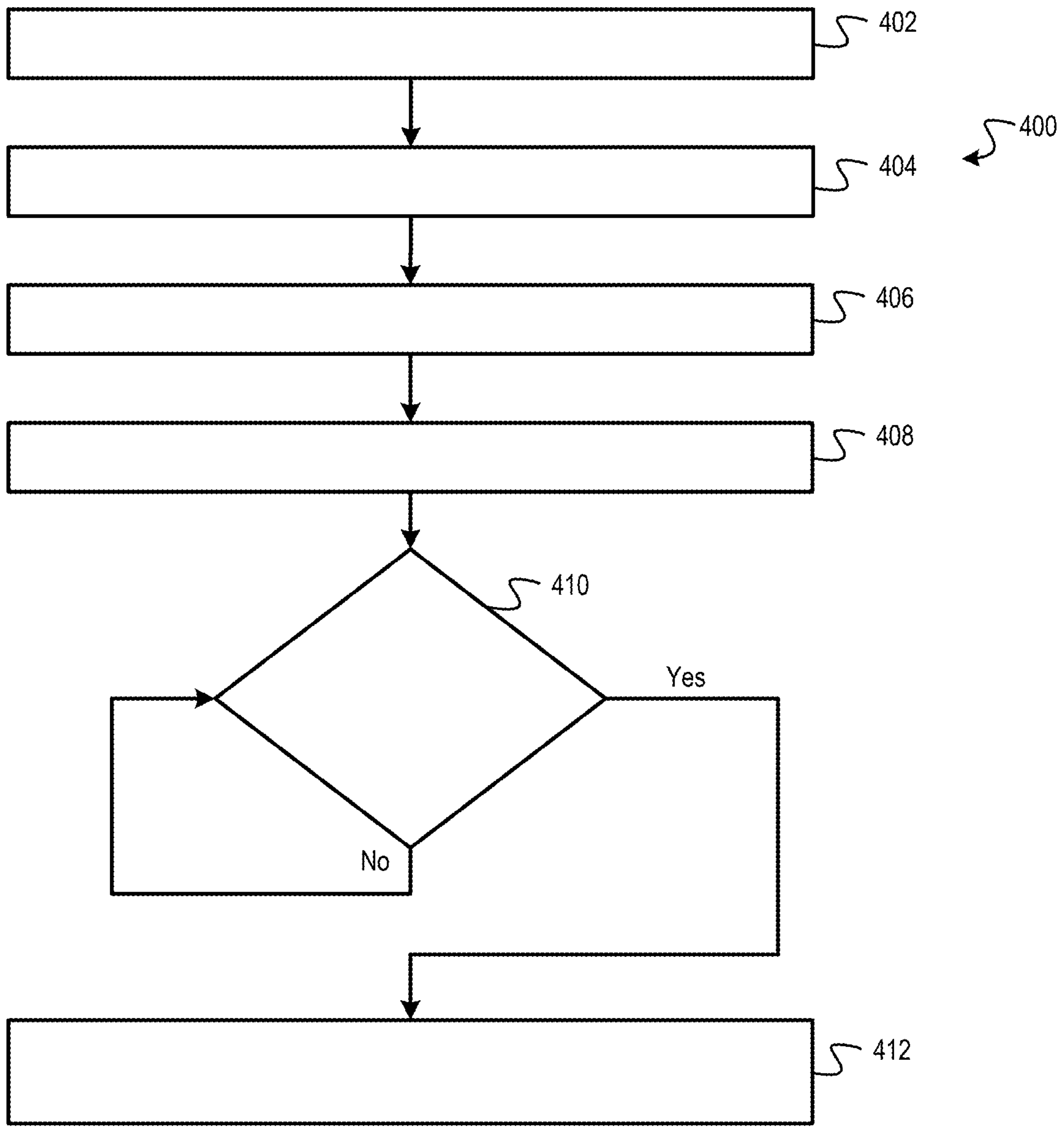
FIG. 4 is a flowchart representation of an exemplary method for mitigating cold start emissions via implementation of a zero-turbine speed of a turbine accordance with at least one embodiment.

Referring to FIG. 4, a flowchart representation of an exemplary method 400 for mitigating cold start emissions via implementation of a zero-turbine speed of a turbine 312 accordance with at least one embodiment is shown. The method 400 will be described with reference to an exemplary implementation of an embodiment of a cold start emission mitigation system 100. As can be appreciated in light of the disclosure, the order of operation within the method 400 is not limited to the sequential execution as illustrated in FIG. 4 but may be performed in one or more varying orders as applicable and in accordance with the present disclosure.

At 402, the cold start emission mitigation system 100 receives an ignition turn on signal from the ignition switch 204 of the vehicle 10. In at least one embodiment, the turbine speed manager 200 receives the ignition turn on signal from the ignition switch 204 of the vehicle 10. The ignition turn on signal is generated in response to activation of the ignition switch 204 to start the engine 304. The ignition switch 204 is defined as switches that are used to start non-diesel and diesel engines.

The wastegate 306 is a valve that controls the portion of the exhaust gas 324 that flows to the turbine 312 and the portion of the exhaust gas 326 that bypasses the turbine 312 and flows directly to the catalyst brick 308. At 404, the cold start emission mitigation system 100 issues a command to the wastegate actuator 210 to open the wastegate 306. In at least one embodiment, the cold start emission mitigation system 100 issues the command to the wastegate actuator 210 to partially open the wastegate 306. In at least one embodiment, the cold start emission mitigation system 100 issues the command to the wastegate actuator 210 to open the wastegate 306 completely. In at least one embodiment, the turbine speed manager 200 issues the command to the wastegate actuator 210 to open the wastegate 306. In at least one embodiment, the turbine speed manager 200 issues the command to the wastegate actuator 210 to partially open the wastegate 306. In at least one embodiment, the turbine speed manager 200 issues the command to the wastegate actuator 210 to open the wastegate 306 completely.

When the exhaust gas 322 is released by the engine 304 following a combustion process, the exhaust gas 322 has an engine exhaust temperature. The portion of the exhaust gas 324 that flows through the turbine 312 experiences heat loss as the exhaust gas 324 flows through the turbine 312 and has a turbine exhaust temperature. The turbine exhaust temperature of the exhaust gas 324 after the exhaust gas 324 has flowed through the turbine 312 is lower than the engine exhaust temperature of the exhaust gas 322 that was released the engine 304.

The portion of the exhaust gas 326 that bypasses the turbine 312 and flows through the wastegate 306 has a temperature that is close to the engine exhaust temperature of the exhaust gas 322 that was released by the engine 304. Opening the wastegate 306 enables a flow of the exhaust gas 326 having the engine exhaust temperature to flow through the wastegate 306 and directly to the catalyst brick 308 to heat the catalyst brick 308.

Since the exhaust gas 326 that flows through the wastegate 306 experiences less heat loss than the exhaust gas 324 that flows through the turbine 312, the higher temperature of the exhaust gas 326 that flows from the wastegate 306 to the catalyst brick 308 enables the catalyst brick 308 to reach the catalyst light-off temperature in less time than if all of the exhaust gas 322 generated by the engine 304 was routed to the catalyst brick 308 through the turbine 312.

At 406, the cold start emission mitigation system 100 issues a command to the turbo shaft actuator 206 to implement a zero-turbine speed of the turbine 312. In at least one embodiment, the turbine speed manager 200 issues the command to the turbo shaft actuator 206 to implement the zero-turbine speed of a turbine 312. In at least one embodiment, the turbo shaft actuator 206 is a mechanical braking system that clamps and holds the turbo shaft 314 in place to inhibit rotation of the turbine 312 in response to the command. In at least embodiment, the turbo shaft actuator 206 is a motor generator unit (MGU). The MGU generates the clamping force to inhibit rotation of the turbine 312 in response to the command.

The portion of the exhaust gas 324 that passes through the turbine 312 experiences a temperature drop as the exhaust gas 324 passes through the turbine 312. The portion of the exhaust gas 324 has the engine exhaust temperature as the portion of the exhaust gas 324 enters the turbine 312 and the turbine exhaust temperature as the portion of the exhaust gas 324 exits the turbine 312. The turbine exhaust temperature is lower than the engine exhaust temperature.

If the turbine 312 is allowed to rotate at a default turbine speed as the portion of the exhaust gas 324 passes through the turbine 312, the portion of the exhaust gas 324 will have a default turbine exhaust temperature as the portion of the exhaust gas 324 exits the turbine 312. The default turbine exhaust temperature is lower than the engine exhaust temperature.

When the turbo shaft actuator 206 clamps and holds the turbo shaft 314 in place to inhibit the rotation of the turbine 312, the portion of the exhaust gas 324 may have an elevated turbine exhaust temperature as the portion of the exhaust gas 324 exits the turbine 312. The elevated turbine exhaust temperature may be lower than the engine exhaust temperature and higher than the default turbine exhaust temperature. The turbine outlet swirl associated with the portion of the exhaust gas 324 that exits the turbine 312 will be lower when the rotation of the turbine 312 is inhibited. The lower swirl means that less heat is absorbed to the exhaust walls.

When the portion of the exhaust gas 324 having the elevated turbine exhaust temperature flows from the turbine 312 to the catalyst brick 308, the elevated turbine exhaust temperature heats the catalyst brick 308 at a faster rate than if the portion of the exhaust gas 324 had the default turbine exhaust temperature associated with flowing through the turbine 312 rotating at the default turbine speed. The flow of the portion of the exhaust gas 324 having the elevated turbine exhaust temperature to the catalyst brick 308 enables the catalyst brick 308 to reach the catalyst light-off temperature in less time than the flow of the first portion of the exhaust gas 324 having default turbine exhaust temperature to the catalyst brick 308.

At 408, the cold start emission mitigation system 100 determines the catalyst temperature of the catalyst brick 308 based on oxygen sensor data received from the oxygen sensor(s) 208 associated with the catalyst brick 308. In at least one embodiment, the turbine speed manager 200 determines the catalyst temperature of the catalyst brick 308 based on oxygen sensor data received from the oxygen sensor(s) 208 associated with the catalyst brick 308. The catalyst temperature sensor 208 provides the catalyst temperature of the catalyst brick 308.

At 410, the cold start emission mitigation system 100 determines whether the catalyst temperature is greater than the catalyst light-off temperature. In at least one embodiment, the turbine speed manager 200 determines whether the catalyst temperature is greater than the catalyst light-off temperature. If the catalyst temperature is determined to not be greater than the catalyst light-off temperature, 410 is repeated. If the catalyst temperature is determined to be greater than the catalyst light-off temperature, the cold start emission mitigation system 100 issues a command to the turbo shaft actuator 206 to release the clamping of the turbo shaft 314 and allow the turbine 312 to rotate at the default turbine speed at 412. In at least one embodiment, if the catalyst temperature is determined to be greater than the catalyst light-off temperature, the turbine speed manager 200 issues the command to the turbo shaft actuator 206 to release the clamping of the turbo shaft 314 and allow the turbine 312 to rotate at the default turbine speed at 412.

Figure 5:
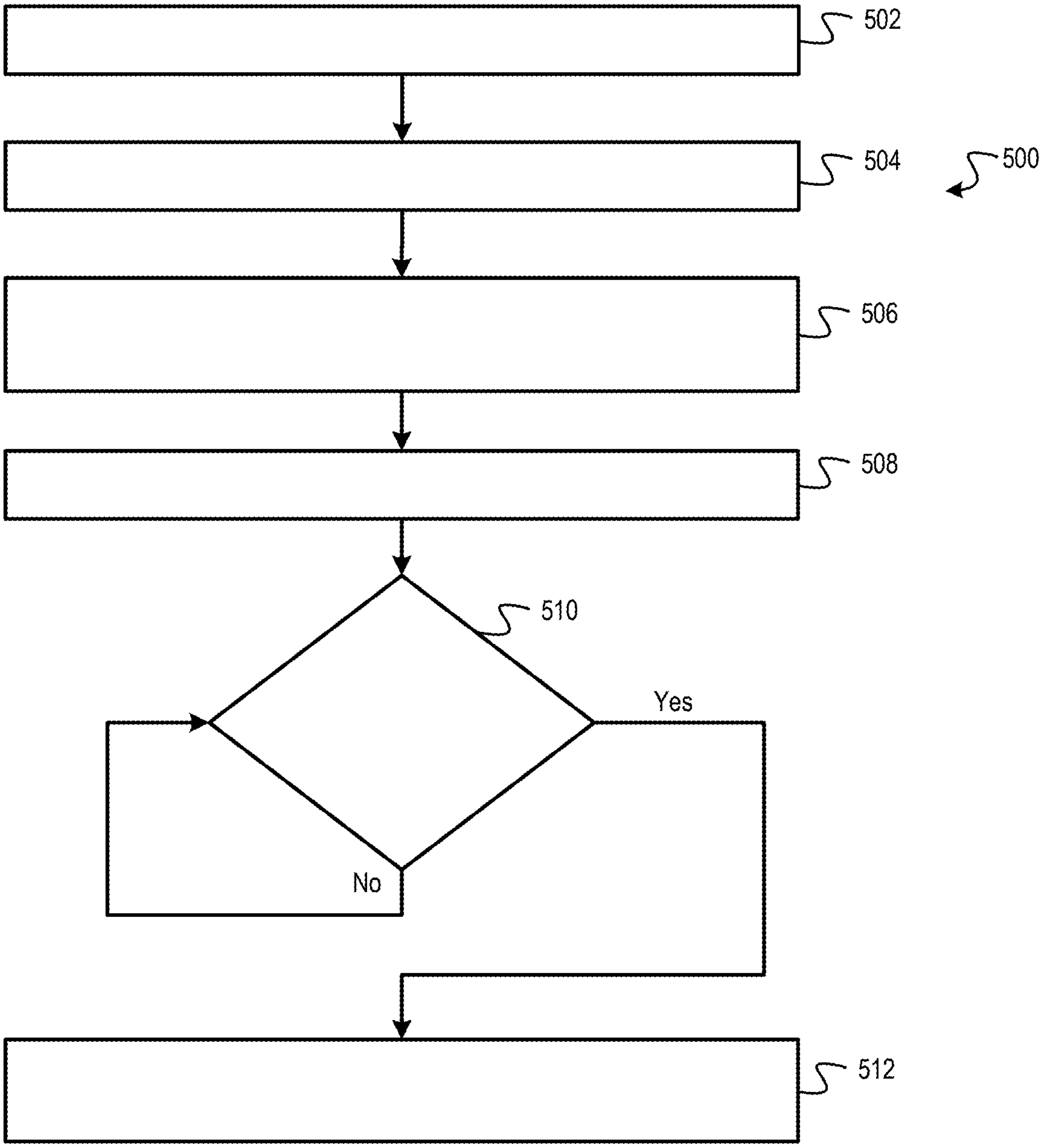
FIG. 5 is a flowchart representation of an exemplary method for mitigating cold start emissions by implementing a turbine speed based on turbine outlet swirl accordance with at least one embodiment.

Referring to FIG. 5, a flowchart representation of an exemplary method 500 for mitigating cold start emissions by implementing a turbine speed based on turbine outlet swirl accordance with at least one embodiment is shown. The method 500 will be described with reference to an exemplary implementation of an embodiment of a cold start emission mitigation system 100. As can be appreciated in light of the disclosure, the order of operation within the method 500 is not limited to the sequential execution as illustrated in FIG. 5 but may be performed in one or more varying orders as applicable and in accordance with the present disclosure.

At 502, the cold start emission mitigation system 100 receives an ignition turn on signal from the ignition switch 204 of the vehicle 10. In at least one embodiment, the turbine speed manager 200 receives the ignition turn on signal from the ignition switch 204 of the vehicle 10. The ignition turn on signal is generated in response to activation of the ignition switch 204 to start the engine 304. The ignition switch 204 is defined as switches that are used to start non-diesel and diesel engines.

The wastegate 306 is a valve that controls the portion of the exhaust gas 324 that flows to the turbine 312 and the portion of the exhaust gas 326 that bypasses the turbine 312 and flows directly to the catalyst brick 308. At 504, the cold start emission mitigation system 100 issues a command to the wastegate actuator 210 to open the wastegate 306. In at least one embodiment, the cold start emission mitigation system 100 issues the command to the wastegate actuator 210 to partially open the wastegate 306. In at least one embodiment, the cold start emission mitigation system 100 issues the command to the wastegate actuator 210 to open the wastegate 306 completely. In at least one embodiment, the turbine speed manager 200 issues the command to the wastegate actuator 210 to open the wastegate 306. In at least one embodiment, the turbine speed manager 200 issues the command to the wastegate actuator 210 to partially open the wastegate 306. In at least one embodiment, the turbine speed manager 200 issues the command to the wastegate actuator 210 to open the wastegate 306 completely.

When the exhaust gas 322 is released by the engine 304 following a combustion process, the exhaust gas 322 has an engine exhaust temperature. The portion of the exhaust gas 324 that flows through the turbine 312 experiences heat loss as the exhaust gas 324 flows through the turbine 312 and has a turbine exhaust temperature. The turbine exhaust temperature of the exhaust gas 324 after the exhaust gas 324 has flowed through the turbine 312 is lower than the engine exhaust temperature of the exhaust gas 322 that was released the engine 304.

The portion of the exhaust gas 326 that bypasses the turbine 312 and flows through the wastegate 306 has a temperature that is close to the engine exhaust temperature of the exhaust gas 322 that was released by the engine 304. Opening the wastegate 306 enables a flow of the exhaust gas 326 having the engine exhaust temperature to flow through the wastegate 306 and directly to the catalyst brick 308 to heat the catalyst brick 308.

Since the exhaust gas 326 that flows through the wastegate 306 experiences less heat loss than the exhaust gas 324 that flows through the turbine 312, the higher temperature of the exhaust gas 326 that flows from the wastegate 306 to the catalyst brick 308 enables the catalyst brick 308 to reach the catalyst light-off temperature in less time than if all of the exhaust gas 322 generated by the engine 304 was routed to the catalyst brick 308 through the turbine 312.

At 506, the turbine speed manager 200 issues a command to the turbo shaft actuator 206 to implement an adjusted turbine speed of the turbine 312. The turbine speed manager 200 receives the adjusted turbine speed from the turbine model 202. The turbine model 202 determines the adjusted turbine speed for the turbine 312 based turbine outlet swirl. A portion of the exhaust gas 324 flows through the turbine 312 and exits the turbine 312 at a turbine outlet. The portion of the exhaust gas 324 has a turbine outlet swirl as the portion of exhaust gas 324 exits the turbine outlet. The turbine outlet swirl is turbulence resulting from the portion of the exhaust gas 324 flowing through the turbine 312. The turbine outlet swirl causes a temperature drop in the portion of the exhaust gas 324 as it flows from the turbine outlet to the catalyst brick 308.

The turbine outlet swirl has a default turbine outlet swirl resulting from the portion of the exhaust gas 324 flowing through the turbine 312 while the turbine 312 is rotated at a default turbine speed. The portion of the exhaust gas 324 will have a default turbine exhaust temperature as the portion of the exhaust gas 324 reaches the catalyst brick 308. The default turbine exhaust temperature is based on the default turbine output swirl.

The turbine model 202 is configured to determine a zero-turbine speed turbine outlet swirl associated with maintaining the turbine 312 at a zero-turbine speed as the exhaust gas 324 flows through the turbine 312. If the portion of the exhaust gas 324 flows through the turbine 312 while the turbine 312 is maintained at the zero-turbine speed, the exhaust gas 324 will have a zero-turbine outlet speed exhaust temperature when the portion of the exhaust gas 324 reaches the catalyst brick 308.

The turbine model 202 is configured to determine an adjusted turbine speed for the turbine 312 that generates a reduced turbine outlet swirl. The reduced turbine outlet swirl is less than the zero-turbine speed turbine outlet swirl and the default turbine outlet swirl. The adjusted turbine speed is designed to counteract the zero-turbine speed turbine outlet swirl so that the reduced turbine outlet swirl generated at the adjusted turbine speed is as low as possible. When the portion of the exhaust gas 324 flows through the turbine 312 while the turbine 312 is rotated at the adjusted turbine speed, the reduced turbine outlet swirl will result in the exhaust gas 324 having an elevated turbine exhaust temperature as the portion of the exhaust gas 324 reaches the catalyst brick 308. Lowering the turbine outlet swirl will lower the heat transfer to the inner exhaust walls. The elevated turbine exhaust temperature is greater than the default turbine exhaust temperature and the zero-turbine outlet speed exhaust temperature. When the portion of the exhaust gas 324 having the elevated turbine exhaust temperature reaches the catalyst brick 308, the elevated turbine exhaust temperature heats the catalyst brick 308 at a faster rate that if the portion of the exhaust gas 324 had the default turbine exhaust temperature.

In at least one embodiment, the turbine model 202 is trained prior to installation in the vehicle 10 using engine test data associated with the internal combustion engine system 300. In at least one embodiment, the turbine model 202 is a mathematical model configured to calculate the adjusted turbine speed. In at least one embodiment, the turbine model 202 is configured to generate the adjusted turbine speed based in part on one or more of the exhaust gas flow rate of the portion of the exhaust gas 324, an exhaust gas temperature, a turbine fan blade configuration of the turbine 312, and an altitude of the vehicle 10.

At 508, the cold start emission mitigation system determines the catalyst temperature of the catalyst brick 308 based on oxygen sensor data received from the oxygen sensor(s) 208 associated with the catalyst brick 308. In at least one embodiment, the turbine speed manager 200 determines the catalyst temperature of the catalyst brick 308 based on oxygen sensor data received from the oxygen sensor(s) 208 associated with the catalyst brick 308.

At 510, the cold start emission mitigation system 100 determines whether the catalyst temperature is greater than the catalyst light-off temperature. In at least one embodiment, the turbine speed manager 200 determines whether the catalyst temperature is greater than the catalyst light-off temperature. If the catalyst temperature is determined to not be greater than the catalyst light-off temperature, 510 is repeated. If the catalyst temperature is determined to be greater than the catalyst light-off temperature, the cold start emission mitigation system 100 issues a command to the turbo shaft actuator 206 to rotate the turbine 312 at the default turbine speed at 512. In at least one embodiment, if the catalyst temperature is determined to be greater than the catalyst light-off temperature, the turbine speed manager 200 issues the command to the turbo shaft actuator 206 to rotate the turbine 312 at the default turbine speed at 512.

Figure 6:
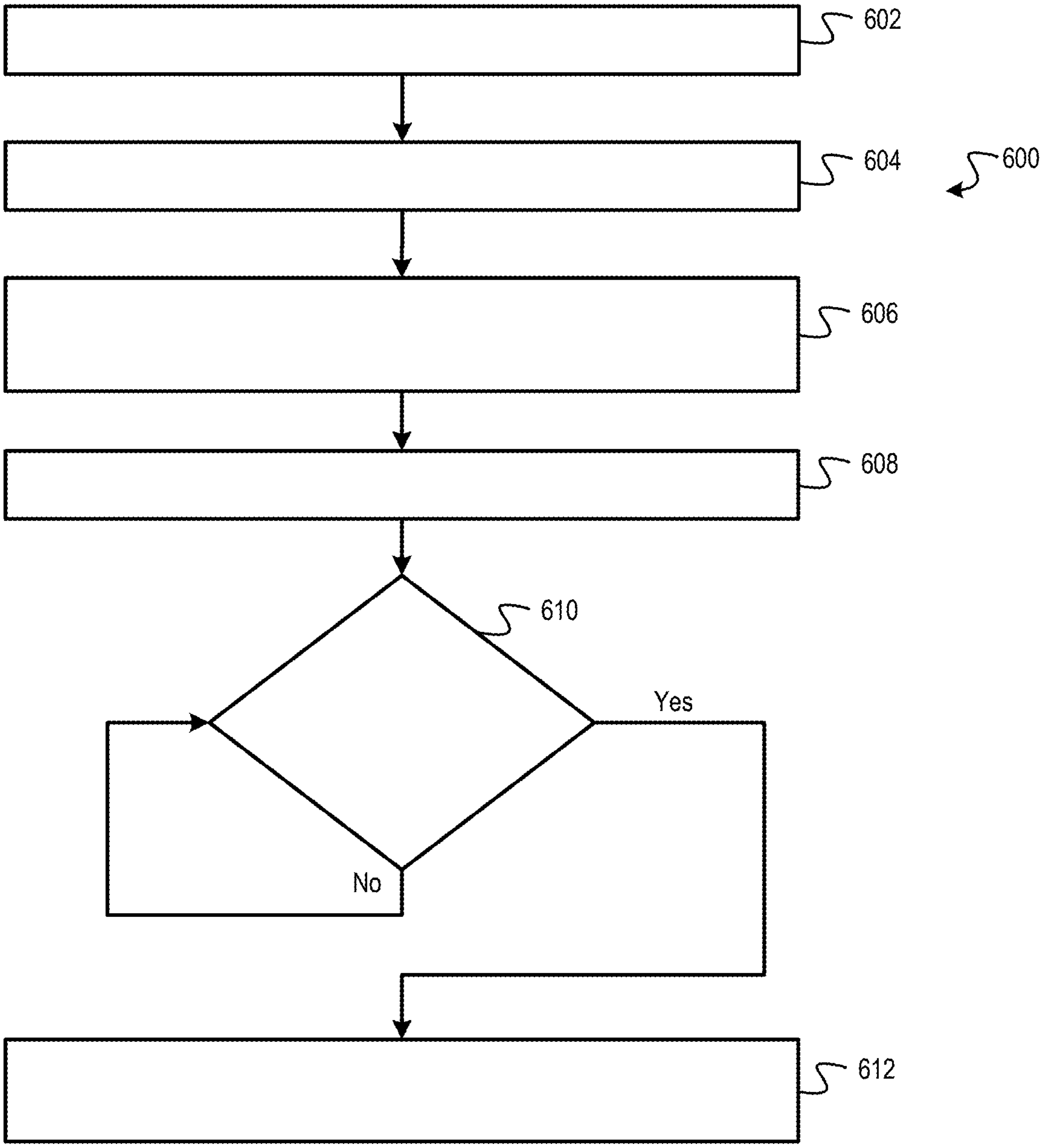
FIG. 6 is a flowchart representation of an exemplary method for managing cold start emissions by implementing a turbine speed based on an exhaust gas expansion accordance with at least one embodiment.

Referring to FIG. 6, a flowchart representation of an exemplary method 600 for managing cold start emissions by implementing a turbine speed based on exhaust gas expansion accordance with at least one embodiment is shown. The method 600 will be described with reference to an exemplary implementation of an embodiment of a cold start emission mitigation system 100. As can be appreciated in light of the disclosure, the order of operation within the method 600 is not limited to the sequential execution as illustrated in FIG. 6 but may be performed in one or more varying orders as applicable and in accordance with the present disclosure.

At 602, the cold start emission mitigation system 100 receives an ignition turn on signal from the ignition switch 204 of the vehicle 10. In at least one embodiment, the turbine speed manager 200 receives the ignition turn on signal from the ignition switch 204 of the vehicle 10. The ignition turn on signal is generated in response to activation of the ignition switch 204 to start the engine 304. The ignition switch 204 is defined as switches that are used to start non-diesel and diesel engines.

The wastegate 306 is a valve that controls the portion of the exhaust gas 324 that flows to the turbine 312 and the portion of the exhaust gas 326 that bypasses the turbine 312 and flows directly to the catalyst brick 308. At 604, the cold start emission mitigation system 100 issues a command to the wastegate actuator 210 to open the wastegate 306. In at least one embodiment, the cold start emission mitigation system 100 issues the command to the wastegate actuator 210 to partially open the wastegate 306. In at least one embodiment, the cold start emission mitigation system 100 issues the command to the wastegate actuator 210 to open the wastegate 306 completely. In at least one embodiment, the turbine speed manager 200 issues the command to the wastegate actuator 210 to open the wastegate 306. In at least one embodiment, the turbine speed manager 200 issues the command to the wastegate actuator 210 to partially open the wastegate 306. In at least one embodiment, the turbine speed manager 200 issues the command to the wastegate actuator 210 to open the wastegate 306 completely.

When the exhaust gas 322 is released by the engine 304 following a combustion process, the exhaust gas 322 has an engine exhaust temperature. The portion of the exhaust gas 324 that flows through the turbine 312 experiences heat loss as the exhaust gas 324 flows through the turbine 312 and has a turbine exhaust temperature. The turbine exhaust temperature of the exhaust gas 324 after the exhaust gas 324 has flowed through the turbine 312 is lower than the engine exhaust temperature of the exhaust gas 322 that was released the engine 304.

The portion of the exhaust gas 326 that bypasses the turbine 312 and flows through the wastegate 306 has a temperature that is close to the engine exhaust temperature of the exhaust gas 322 that was released by the engine 304. Opening the wastegate 306 enables a flow of the exhaust gas 326 having the engine exhaust temperature to flow through the wastegate 306 and directly to the catalyst brick 308 to heat the catalyst brick 308.

Since the exhaust gas 326 that flows through the wastegate 306 experiences less heat loss than the exhaust gas 324 that flows through the turbine 312, the higher temperature of the exhaust gas 326 that flows from the wastegate 306 to the catalyst brick 308 enables the catalyst brick 308 to reach the catalyst light-off temperature in less time than if all of the exhaust gas 322 generated by the engine 304 was routed to the catalyst brick 308 through the turbine 312.

At 606, the turbine speed manager 200 issues a command to the turbo shaft actuator 206 to implement an adjusted turbine speed of the turbine 312. The turbine speed manager 200 receives the adjusted turbine speed from the turbine model 202. The turbine model 202 determines the adjusted turbine speed for the turbine 312 based exhaust gas expansion. A portion of the exhaust gas 324 flows through the turbine 312 and exits the turbine 312 at a turbine outlet. The portion of the exhaust gas 324 has an exhaust gas expansion as the portion of exhaust gas 324 exits the turbine outlet. The exhaust gas expansion results from the portion of the exhaust gas 324 flowing through the turbine 312. The exhaust gas expansion causes a temperature drop in the portion of the exhaust gas 324 as it flows from the turbine outlet to the catalyst brick 308.

The exhaust gas expansion has a default exhaust gas expansion resulting from the portion of the exhaust gas 324 flowing through the turbine 312 while the turbine 312 is rotated at a default turbine speed. The portion of the exhaust gas 324 will have a default turbine exhaust temperature as the portion of the exhaust gas 324 reaches the catalyst brick 308. The default turbine exhaust temperature is based on the default exhaust gas expansion.

The turbine model 202 is configured to determine an adjusted turbine speed for the turbine 312 that generates a reduced exhaust gas expansion. The reduced exhaust gas expansion is less than the default exhaust gas expansion. The adjusted turbine speed is less than the default turbine speed and is designed to minimize exhaust gas expansion. When the portion of the exhaust gas 324 flows through the turbine 312 while the turbine 312 is rotated at the adjusted turbine speed, the reduced exhaust gas expansion will result in the exhaust gas 324 having an elevated turbine exhaust temperature as the portion of the exhaust gas 324 reaches the catalyst brick 308. The elevated turbine exhaust temperature is greater than the default turbine exhaust temperature. When the portion of the exhaust gas 324 having the elevated turbine exhaust temperature reaches the catalyst brick 308, the elevated turbine exhaust temperature heats the catalyst brick 308 at a faster rate that if the portion of the exhaust gas 324 had the default turbine exhaust temperature.

In at least one embodiment, the turbine model 202 is trained prior to installation in the vehicle 10 using engine test data associated with the internal combustion engine system 300. In at least one embodiment, the turbine model 202 is a mathematical model configured to calculate the adjusted turbine speed. In at least one embodiment, the turbine model 202 is configured to generate the adjusted turbine speed based in part on one or more of the exhaust gas flow rate of the portion of the exhaust gas 324, an exhaust gas temperature, a turbine fan blade configuration of the turbine 312, and an altitude of the vehicle 10. In at least one embodiment, the default exhaust gas expansion and the reduced exhaust gas is based in part on an exhaust flow rate from an exhaust manifold of the vehicle 10 to the turbine 312.

At 608, the cold start emission mitigation system determines the catalyst temperature of the catalyst brick 308 based on oxygen sensor data received from the oxygen sensor(s) 208 associated with the catalyst brick 308. In at least one embodiment, the turbine speed manager 200 determines the catalyst temperature of the catalyst brick 308 based on oxygen sensor data received from the oxygen sensor(s) 208 associated with the catalyst brick 308.

At 610, the cold start emission mitigation system 100 determines whether the catalyst temperature is greater than the catalyst light-off temperature. In at least one embodiment, the turbine speed manager 200 determines whether the catalyst temperature is greater than the catalyst light-off temperature. If the catalyst temperature is determined to not be greater than the catalyst light-off temperature, 610 is repeated. If the catalyst temperature is determined to be greater than the catalyst light-off temperature, the cold start emission mitigation system 100 issues a command to the turbo shaft actuator 206 to rotate the turbine 312 at the default turbine speed at 612. In at least one embodiment, if the catalyst temperature is determined to be greater than the catalyst light-off temperature, the turbine speed manager 200 issues the command to the turbo shaft actuator 206 to rotate the turbine 312 at the default turbine speed at 612.

In at least one embodiment, the turbine model 202 is configured to determine a first turbine outlet swirl of the exhaust gas 324 resulting from the exhaust gas 324 flowing through the turbine 312 while maintaining the turbine 312 at a turbine speed of zero. The turbine model 202 is configured to determine a first exhaust gas expansion resulting from the exhaust gas 324 flowing through the turbine 312 while rotating the turbine at the default turbine speed. The turbine model 202 is configured to generate the adjusted turbine speed based on the first turbine outlet swirl to be less than the default turbine speed. The second turbine outlet swirl of the exhaust gas 324 resulting from the exhaust gas 324 flowing through the turbine 312 while rotating the turbine 312 at the adjusted turbine speed is less than the first turbine outlet swirl. A second exhaust gas expansion resulting from the exhaust gas 324 flowing through the turbine 312 while rotating the turbine 312 at the first turbine speed is less than the first exhaust gas expansion.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of mitigating cold start emissions generated by a vehicle comprising:

receiving, at a controller, an ignition turn on signal from an ignition switch of the vehicle;

issuing a first control signal, by the controller, to a wastegate actuator to completely open a wastegate to cause a first portion of exhaust gas generated by an engine of the vehicle to pass through a turbine of a turbocharger to a catalyst brick of the vehicle and a second portion of the exhaust gas to bypass the turbine and pass through the wastegate to the catalyst brick;

issuing, by the controller, a second control signal to a turbo shaft actuator to implement a zero-turbine speed by inhibiting rotation of the turbine, wherein:

the exhaust gas generated by the engine has an engine exhaust temperature;

rotation of the turbine at a default turbine speed results in the exhaust gas having a default turbine exhaust temperature after the exhaust gas passes through the turbine to the catalyst brick, the default turbine exhaust temperature being lower than the engine exhaust temperature;

implementing the zero-turbine speed results in the first portion of the exhaust gas having an elevated turbine exhaust temperature after the first portion of the exhaust gas passes through the turbine to the catalyst brick, the elevated turbine exhaust temperature being lower than the engine exhaust temperature and higher than the default turbine exhaust temperature; and the second portion of the exhaust gas flowing through the wastegate to the catalyst brick has the engine exhaust temperature;

receiving, at the controller, oxygen sensor data associated with the catalyst brick from an oxygen sensor;

determining, by the controller, a catalyst temperature based on the oxygen sensor data;

determining, by the controller, whether the catalyst temperature is greater than a catalyst light-off temperature; and issuing, by the controller, a third control signal to the turbo shaft actuator to rotate the turbine at the default turbine speed based on the determination.

2. The method of claim 1, further comprising issuing, by the controller, the second control signal and the third control signal to the turbo shaft actuator via a motor generator unit (MGU).

3. The method of claim 1, wherein the ignition turn on signal is generated in response to activation of the ignition switch to start the engine.

4. The method of claim 1, wherein:

a first turbine outlet swirl is associated with the rotation of the turbine at the default turbine speed;

a second turbine outlet swirl is associated with the implementation of the zero-turbine speed; and the second turbine outlet swirl is lower than the first turbine outlet swirl.

5. The method of claim 1, wherein the first portion of the exhaust gas and the second portion of the exhaust gas are processed by the catalyst brick prior to release as emissions from the vehicle.

6. The method of claim 1, wherein the first portion of the exhaust gas and the second portion of the exhaust gas combine prior to passing through the catalyst brick.

7. A system for mitigating cold start emissions generated by a vehicle, comprising:

at least one processor; and at least one memory communicatively coupled to the at least one processor, the at least one memory comprising instructions that upon execution by the at least one processor, causes the at least one processor to:

receive an ignition turn on signal from an ignition switch of the vehicle;

issue a first control signal to a wastegate actuator to completely open a wastegate to cause a first portion of exhaust gas generated by an engine of the vehicle to pass through a turbine of a turbocharger to a catalyst brick of the vehicle and a second portion of the exhaust gas to bypass the turbine and pass through the wastegate to the catalyst brick;

issue a second control signal to a turbo shaft actuator to implement a zero-turbine speed by inhibiting rotation of the turbine, wherein:

the exhaust gas generated by the engine has an engine exhaust temperature;

rotation of the turbine at a default turbine speed results in the exhaust gas having a default turbine exhaust temperature after the exhaust gas passes through the turbine to the catalyst brick, the default turbine exhaust temperature being lower than the engine exhaust temperature;

implementing the zero-turbine speed results in the first portion of the exhaust gas having an elevated turbine exhaust temperature after the first portion of the exhaust gas passes through the turbine to the catalyst brick, the elevated turbine exhaust temperature being lower than the engine exhaust temperature and higher than the default turbine exhaust temperature; and the second portion of the exhaust gas flowing through the wastegate to the catalyst brick has the engine exhaust temperature;

receive oxygen sensor data associated with the catalyst brick from an oxygen sensor;

determine a catalyst temperature based on the oxygen sensor data;

determine whether the catalyst temperature is greater than a catalyst light-off temperature; and issue a third control signal to the turbo shaft actuator to rotate the turbine at the default turbine speed based on the determination.

8. The system of claim 7, wherein the at least one memory further comprises instructions that upon execution by the at least one processor, causes the at least one processor to issue the second control signal and the third control signal to the turbo shaft actuator via a motor generator unit (MGU).

9. The system of claim 7, wherein the ignition turn on signal is generated in response to activation of the ignition switch to start the engine.

10. The system of claim 7, wherein:

a first turbine outlet swirl is associated with the rotation of the turbine at the default turbine speed;

a second turbine outlet swirl is associated with the implementation of the zero-turbine speed; and the second turbine outlet swirl is lower than the first turbine outlet swirl.

11. The system of claim 7, wherein the first portion of the exhaust gas and the second portion of the exhaust gas are processed by the catalyst brick prior to release as emissions from the vehicle.

12. The system of claim 7, wherein the first portion of the exhaust gas and the second portion of the exhaust gas combine prior to passing through the catalyst brick.

13. The system of claim 7, wherein the catalyst light-off temperature is 500° Celsius.

14. A vehicle including a system for mitigating cold start emissions generated by the vehicle comprising:

at least one processor; and at least one memory communicatively coupled to the at least one processor, the at least one memory comprising instructions that upon execution by the at least one processor, causes the at least one processor to:

receive an ignition turn on signal from an ignition switch of the vehicle;

issue a first control signal to a wastegate actuator to completely open a wastegate to cause a first portion of exhaust gas generated by an engine of the vehicle to pass through a turbine of a turbocharger to a catalyst brick of the vehicle and a second portion of the exhaust gas to bypass the turbine and pass through the wastegate to the catalyst brick;

issue a second control signal to a turbo shaft actuator to implement a zero-turbine speed by inhibiting rotation of the turbine, wherein:

the exhaust gas generated by the engine has an engine exhaust temperature;

rotation of the turbine at a default turbine speed results in the exhaust gas having a default turbine exhaust temperature after the exhaust gas passes through the turbine to the catalyst brick, the default turbine exhaust temperature being lower than the engine exhaust temperature;

implementing the zero-turbine speed results in the first portion of the exhaust gas having an elevated turbine exhaust temperature after the first portion of the exhaust gas passes through the turbine to the catalyst brick, the elevated turbine exhaust temperature being lower than the engine exhaust temperature and higher than the default turbine exhaust temperature; and the second portion of the exhaust gas flowing through the wastegate to the catalyst brick has the engine exhaust temperature;

receive oxygen sensor data associated with the catalyst brick from an oxygen sensor;

determine a catalyst temperature based on the oxygen sensor data;

determine whether the catalyst temperature is greater than a catalyst light-off temperature; and issue a third control signal to the turbo shaft actuator to rotate the turbine at the default turbine speed based on the determination.

15. The vehicle of claim 14, wherein the at least one memory further comprises instructions that upon execution by the at least one processor, causes the at least one processor to issue the second control signal and the third control signal to the turbo shaft actuator via a motor generator unit (MGU).

16. The vehicle of claim 14, wherein the ignition turn on signal is generated in response to activation of the ignition switch to start the engine.

17. The vehicle of claim 14, wherein:

a first turbine outlet swirl is associated with the rotation of the turbine at the default turbine speed;

a second turbine outlet swirl is associated with the implementation of the zero-turbine speed; and the second turbine outlet swirl is lower than the first turbine outlet swirl.

18. The vehicle of claim 14, wherein the first portion of the exhaust gas and the second portion of the exhaust gas are processed by the catalyst brick prior to release as emissions from the vehicle.

19. The vehicle of claim 14, wherein the first portion of the exhaust gas and the second portion of the exhaust gas combine prior to passing through the catalyst brick.

20. The vehicle of claim 14, wherein the catalyst light-off temperature is 500° Celsius.

* * * * *